June 7, 1932. L. HLADIK 1,862,362
DEVICE FOR STARTING AUXILIARY ENGINES FOR LOCOMOTVES
Filed April 8, 1929
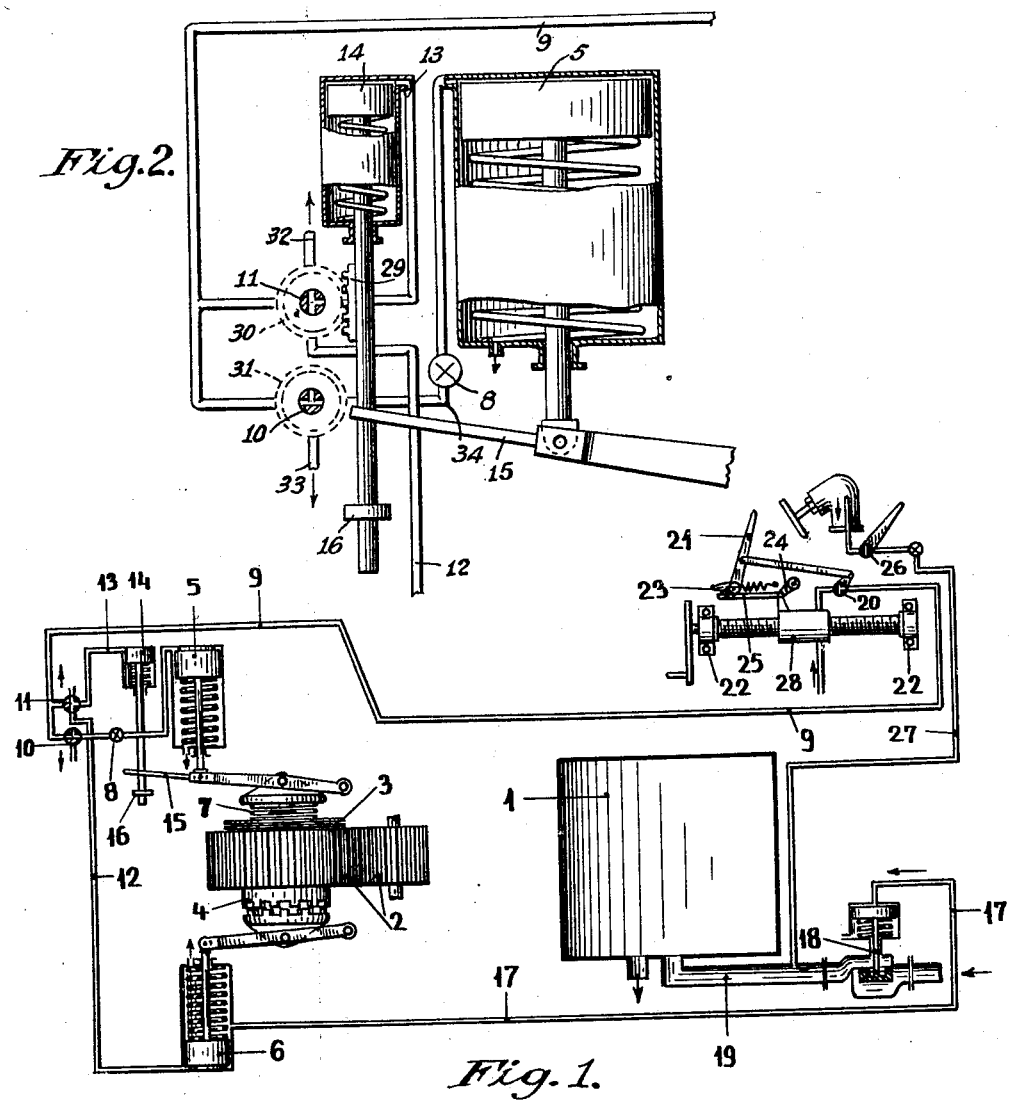
Ladislav Hladik
INVENTOR;
By Otto Munk
his Attorney.

Patented June 7, 1932

1,862,362

UNITED STATES PATENT OFFICE

LADISLAV HLADIK, OF PILSEN, CZECHOSLOVAKIA, ASSIGNOR TO LIMITED COMPANY FORMERLY THE SKODA WORKS, PLZEN, OF PRAGUE, CZECHOSLOVAKIA, A CORPORATION OF CZECHOSLOVAKIA

DEVICE FOR STARTING AUXILIARY ENGINES FOR LOCOMOTIVES

Application filed April 8, 1929, Serial No. 353,274, and in Czechoslovakia April 19, 1928.

This invention relates to devices for starting auxiliary engines of locomotives, said engines consisting ordinarily of motors which are operated by steam, pressure-air and the like and serve as an auxiliary drive for a supporting axle of the locomotive or the tender. A transmission in the form of a gearing is ordinarily employed during travel at small speed, the auxiliary engines being put out of operation after the speed has attained a certain value. These auxiliary engines, however, should be so constructed and arranged that they do not require any additional attention on the part of the locomotive engineer whose full presence of mind is required for attending the main engine of the locomotive and for observing the railway track.

An essential element of the starting device forming part of this invention consists of the organ which is required for mechanically or automatically starting the auxiliary engine, such as a clutch or the like. Evidently, it will be difficult to provide a proper space for the reception of the starting instrumentalities, especially in view of the fact that large forces have to be transmitted in the present case. The known constructions of starting devices of the present kind comprise either gears which may be thrown into and out of engagement or clutches, claw-couplings or the like and generally are connected with the drawback that severe shocks will be produced during throwing-in said gears, clutches or the like. A friction-clutch on account of its softness of operation would be particularly well suited for the present purpose but cannot be employed owing to the lack of space for a friction clutch of a proper size which is required for the transmission of large torques.

By this invention the problem of constructing a starting device for the present purpose is solved in such a manner that a combination of clutches or couplings is employed, said combination consisting of a smaller friction clutch and a larger claw coupling.

More particularly, according to this invention the friction clutch serves for bringing the two elements to be coupled with each other to even speeds in no-load condition thereof, that is to say at a time when only small forces have to be transmitted. On the other hand, according to this invention the claw coupling is actuated when said two elements have come up to proper speed due to the friction clutch and the auxiliary engine or motor is started not before the claw coupling is in fully thrown-in condition. The said friction clutch and the said claw coupling, moreover, may be actuated either by hand or automatically by means of steam, pressure-air and the like.

An example of a starting device constructed according to this invention is diagrammatically shown in Fig. 1 of the accompanying drawing, a steam-engine being chosen as an auxiliary engine for the locomotive, while the actuation of the starting device is effected automatically by means of steam or pressure-air and Fig. 2 shows, in a diagrammatic view, the mechanical connection for operating the valves.

Referring now more particularly to the drawing, the steam-engine 1 serves to drive the axle of the vehicle by means of the gears 2, the friction clutch 3 and the claw coupling 4 and by releasing said clutches or couplings the steam-engine will be fully disconnected from said axle. The clutch 3 is an auxiliary clutch or coupling in the form of a friction clutch, while the clutch or coupling 4 is a main clutch or coupling in the form of a claw coupling. The cylinders 5 and 6 with their pistons serve to connect and disconnect the clutches or couplings 3 and 4, compressed air or steam being used to drive the pistons in said cylinders and by means of a mechanical transmission the clutch or couplings are thrown into engaged position. When letting off the steam or pressure-air from said cylinders the clutches or couplings will again be released by action of retracting springs which act on said pistons. The friction clutch 3, more particularly, is actuated by the pressure in the cylinder 5 in a somewhat indirect way, a spring 7 being interposed for this purpose. In this manner there will be a more gradual increase of the frictional pressure during throwing-in of the friction clutch.

Steam or pressure-air is conveyed into the cylinder 5 which serves to operate the friction-clutch 3 by way of a furthur control organ 8, such as a choke or storage device, said organ or device being properly dimensioned so that the pressure above the piston will increase only gradually. An air-distributor is associated with the control cylinder 5, said air-distributor serving to actuate either a slide-valve or a system of cocks in such a manner that the operation of engaging and disengaging the clutches or couplings 3 and 4 will take place in proper sequence. In the drawing said air-distributor is shown in the form of the cocks 10 and 11 and the cylinder 14.

The clutches or couplings 3 and 4 are thrown-in in the following manner: The steam or pressure-air which enters the pipe 9 is carried to the cocks 10 and 11, the latter being closed and the former open, while the air is passed into the control organ 8 and from here slowly towards the rear of the piston in the cylinder 5 which forms the actuating organ for the friction clutch 3. The piston of this cylinder now will commence to bring the driven and the driving part of the friction-clutch 3 gradually in contact with each other in such a manner that after a certain time both elements to be coupled with each other, that is the axle of the locomotive and the steam-engine, will be started and come up to even speed. In this moment air is conveyed by means of the distributor into the cylinder 6 of the claw coupling 4, this causing the latter to be thrown-in.

This may, for instance, be carried out by causing the actuating lever 15 which is associated with the piston in the cylinder 5 to engage with the stop 16 carried by the piston rod of the auxiliary cylinder 14. A toothed rack 29 is carried by the piston rod and engages the teeth of pinion gears 30 and 31 turning with valves 11 and 10 respectively, as illustratively exemplified in Figure 2.

The stop cock 11, when in the position shown, connects the conduit pipe 13 and cylinder 14 with atmosphere through pipe 32 and at the same time the cock opens the space in the cylinder 6 beneath its piston to atmosphere through the conduit pipe 12. The pressure in pipe 9 is, during this position of the cock closed, but upon turning the cock 11 so that air will pass through the pipe 12 into the cylinder 6, both parts of the clutch will be brought in contact with each other. If the claws of the claw coupling should incidentally just be in front of the recesses appertaining to said claws, the claw coupling will immediately be thrown-in and the piston in the cylinder 6 will open the entrance into the pipe 17 and therewith also into the automatic starting valve 18, whose piston again will open the entrance for the steam into the steam-engine, so that the latter will start.

The position of the stop cock 10 as illustrated, opens the passage of steam or compressed air directly from the conduit 9 to the pipe 34, thence to the control valve 8 and finally into the head of the cylinder 5. The valve causes the pressure to increase gradually in the cylinder and as a consequence, the piston moves slowly and the clutch parts 3 are applied gradually until completely connected.

When the lift of the piston of the cylinder 5 continues, the catch 15 connected with the piston rod strikes the stop 16 which is arranged on the piston rod of the auxiliary cylinder 14. The rack 29 of the piston rod of this cylinder engages the tooth wheel 30, which is fixed for rotation with the stop cock 11.

When the piston of the cylinder 5 continues to drop, the lever 15 draws with it the piston rod and the piston of the auxiliary cylinder 14, thus imparting rotation to the stop cock 11 which takes a position to connect the cylinder 6 and 14 and to be closed to atmosphere, the cock 11 connecting both cylinders 5 and 6 with the pressure in the conduit of pipe 9. The pressure, entering the cylinder 6, engages both parts of the clutch coupling and the pressure against the piston of the cylinder 14 effects automatically, further movement in the auxiliary piston, which movement was already started by the engagement of lever 15 with the stop 16. This movement continues and finishes the turning of the stop cock 11; the rack 29 having come into mesh with the pinion wheel 30 causes the valve 11 to bring conduits 12 and 13 into direct connection with the conduit 9 carrying the pressure.

When the piston of the cylinder 14 moves further, the rack 29 of the piston rod engages and rotates the pinion wheel 31 which turns the stop cock 10, 90° to open the connection between cylinder 5 and atmosphere through pipe 33. Consequently, the pressure in cylinder 5 begins to diminish immediately, but due to the control valve 8 pressure is reduced gradually and the friction coupling 3 is released until there is not sufficient frictional engagement to keep rotating movement of both coupled systems together. A small defect in torsion of both coupled systems occurs, but only in one tooth of the clutch coupling and this meshes immediately, i. e. before the mechanical connection of the booster with the axle is finished.

If the claws of the claw coupling or clutch 4 are not positioned in front of the recesses, the clutch will be thrown-in at the next moment. Simultaneously with the entrance of air into the pipe 12 by way of the cock 11 air will also be conveyed to the rear of the piston of the auxiliary cylinder 14 and the piston rod will turn the three-way valve into that position which will cause the air to discharge from the cylinder of the friction-clutch and pass into the atmosphere. The air will now slowly discharge past the control organ 8 and the friction-clutch will now be in condition of release. At a certain moment the friction in said clutch will no more be sufficient to maintain the steam-engine and the axle of the locomotive in condition of even speed, a small relative displacement now taking place so that the claw coupling 4 will come into action and open the starting valve 18 which will cause the starting of the auxiliary steam engine.

In order to permit air to enter the pipe 9 and to effect the proper control of the mechanism which serves for throwing-in the clutches or couplings a starting organ 20, such as a cock or valve may be used.

If the auxiliary engine is designed to operate only in one direction, for instance only for forward travel of the locomotive, it will be of advantage to arrange the organ 20 which serves for the entrance of the air into the pipe 9 in such a manner that said organ may be blocked or otherwise put out of operation during backward travel of the locomotive. In this way an error which may eventually occur will not result in damage to the engine.

In the construction of the starting device as shown in the drawing the control organ 20 may be blocked by arranging the starting device above the bearing 22 of the reversing device for the locomotive and above that part of the range of motion of said reversing device—for instance the nut 28—which range of motion corresponds to the direction of travel of the locomotive for which the auxiliary engine shall be blocked there is provided a parallelogram composed of the levers 23 and 24 and the tension rod 25. Opening of the starting organ 20 which causes pressure-air to enter the pipe 9 may be accomplished solely by a simultaneous motion of the parallelogram 23, 24, 25 which can only take place if the reversing device of the locomotive is in a position which in agreement with the direction of travel of the locomotive, for instance in forward direction.

The auxiliary steam engine may be put out of operation by the reversed sequence of steps, that is by letting-off the air from the pipe through the starting organ 20, the backwardly acting steam causing now all pistons to return to their initial position.

In order to permit the starting device to be put into operation also in case of standstill of the locomotive and of the auxiliary engine, there is provided an auxiliary starting organ 26 by means of which it will be possible at any time to cause as much steam to enter the engine as will be necessary to bring about a start of said engine at reduced speed in no-load condition.

It is evident that according to this invention instead of pressure-air also steam or another fluid may be used in order to operate the control organs for the starting device. Pressure-air, steam or the like may likewise be used for throwing-out the clutches or couplings, instead of the springs shown in the cylinders 5 and 6.

The herein described combination of clutches or couplings may also be used with advantage in other cases where large torques have to be transmitted and where the available space is rather limited.

I claim:

1. In a locomotive or similar vehicle, the combination of an auxiliary engine, with a supporting axle of said locomotive, a pair of clutches or couplings interposed between said auxiliary engine and said supporting axle, one of said clutches or couplings consisting of a friction-clutch and the other of a claw-coupling, mechanism for operating said friction clutch, when starting said auxiliary engine to come up to a speed which is approximately equal to the speed of said supporting axle during travel of said locomotive, and further mechanism for throwing-in said claw coupling at a time when said two speeds are approximately equal.

2. A device for starting auxiliary engines of locomotives or similar vehicles, as specified by claim 1, in which the mechanisms for operating the friction clutch and the claw coupling are adapted to first operate said friction coupling so as to bring the two halves of said claw coupling in a condition to permit engagement thereof, and to release wholly or partly said friction clutch during engagement of said claw coupling.

3. A starting device in combination with auxiliary engines of locomotives, as specified by claim 1, said device comprising a fluid pressure operated controlling organ for actuating the friction clutch and a similar organ for actuating the claw coupling, and spring actuated organs for releasing said friction clutch and said claw coupling.

4. A device for starting auxiliary engines of locomotives or similar vehicles, as specified by claim 1, comprising a control organ for regulating the pressure between the two halves of the friction clutch so as to bring the auxiliary engine approximately to a speed equal to the supporting axle during travel of the locomotive, a control organ adapted to subsequently operate the claw coupling, and an auxiliary cylinder adapted to cause a full or partial release of said friction clutch during engagement between the two halves of the claw coupling.

5. A device for starting auxiliary engines of locomotives or similar vehicles, as specified by claim 1, said auxiliary engine being designed to operate only in one direction, said device comprising a starting organ for said auxiliary engine provided in proximity to the reversing device of the locomotive and adapted to prevent opening of said starting organ and starting of said auxiliary engine during a position of said reversing organ which corresponds to the condition of travel of the locomotive which is opposite to the direction of rotation of said auxiliary engine.

In testimony whereof I affix my signature.

LADISLAV HLADIK.